(12) United States Patent
Morita

(10) Patent No.: US 6,719,482 B2
(45) Date of Patent: Apr. 13, 2004

(54) FLOATING SUPPORT STRUCTURE HAVING VIBRATION DAMPING MEMBER

(75) Inventor: Yuji Morita, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 70 days.

(21) Appl. No.: 10/151,237

(22) Filed: May 21, 2002

(65) Prior Publication Data
US 2003/0002919 A1 Jan. 2, 2003

(30) Foreign Application Priority Data
Jun. 28, 2001 (JP) ......................................... 2001-196305

(51) Int. Cl.[7] ................................ F16D 1/00; F16F 7/00
(52) U.S. Cl. ..................................... 403/408.1; 267/141
(58) Field of Search .............................. 267/141, 141.4, 267/141.5, 153; 403/408.1

(56) References Cited

U.S. PATENT DOCUMENTS

| | | | | |
|---|---|---|---|---|
| 3,128,999 A | * | 4/1964 | Schmitt | 267/153 |
| 4,298,194 A | * | 11/1981 | Marx | 267/64.11 |
| 4,306,708 A | | 12/1981 | Gassaway et al. | |
| 4,530,491 A | * | 7/1985 | Bucksbee et al. | 267/141 |
| 5,609,329 A | * | 3/1997 | Scholl | 267/141 |
| 6,354,578 B1 | | 3/2002 | Nakatsukasa et al. | |

OTHER PUBLICATIONS

Nakatsukasa, *Journal of Denso Technical Disclosure*, No. 122–022, p. 22, Jan. 15, 2002.
Miyasaki, *Journal of Denso Technical Disclosure*, No. 54–021, p21, Jul. 15, 1987.

* cited by examiner

Primary Examiner—Frederick L. Lagman
(74) Attorney, Agent, or Firm—Posz & Bethards, PLC

(57) ABSTRACT

A collar includes a larger diameter flange and a cylindrical body. The cylindrical body has female threads formed along an inner circumferential surface of the cylindrical body. A stopper is provided in the larger diameter flange of the collar. A vibration damping member includes a tubular body. The cylindrical body of the collar is received in a receiving through hole of the tubular body of the vibration damping member. The stopper is located between opposed side walls of a mouth of a recessed opening that is recessed in a mounting portion of a pivot holder. A bolt, which penetrates through a fastening hole of a vehicle body, is threadably engaged with the female threads of the cylindrical body of the collar, so that the pivot holder 16 is floatingly supported relative to a vehicle body.

19 Claims, 7 Drawing Sheets

FLOATING SUPPORT STRUCTURE HAVING VIBRATION DAMPING MEMBER

CROSS REFERENCE TO RELATED APPLICATION

This application is based on and incorporates herein by reference Japanese Patent Application No. 2001-196305 filed on Jun. 28, 2001.

BACKGROUND OF THE INVENTION

1. Field of the Invention

The present invention relates to a floating support structure, and more specifically to a floating support structure, which can restrain conduction of vibrations from a wiper frame of a wiper apparatus to a vehicle body.

2. Description of Related Art

A wiper apparatus is generally arranged at a lower end of a windshield of a vehicle. Some previously proposed wiper apparatuses have a wiper frame, which is installed to a vehicle body. A wiper motor and a wiper link mechanism are connected to the wiper frame. The wiper link mechanism coverts rotation of the wiper motor to rotational reciprocating movement of a pivot shaft. A wiper arm is secured to the pivot shaft, and a wiper blade is connected to a distal end of the wiper arm. During operation of the wiper apparatus, the rotation of the wiper motor is converted to reciprocatory pushing and pulling movements of the wiper link mechanism. The reciprocatory pushing and pulling movements of the wiper link mechanism generate vibrations in the wiper link mechanism and are conducted to the wiper frame. Also, vibrations are generated in the wiper motor and are also conducted to the wiper frame. Thus, in a process of installing the wiper frame to the vehicle body, a floating support structure (vibration damping rubber) is provided between the wiper frame and the vehicle body to restrain conduction of the vibrations from the wiper frame to the vehicle body.

FIG. 11 is a partial schematic cross-sectional view, showing a previously proposed floating support structure. A pivot holder 51 is integrally connected to a wiper frame (not shown) and rotatably supports a pivot shaft (not shown). The pivot holder 51 has a mounting portion 52. A mounting hole 52a penetrates through the mounting portion 52, and a vibration damping rubber 53 is inserted into the mounting hole 52a of the mounting portion 52. The vibration damping rubber 53 includes a receiving through hole 54, which penetrates through the vibration damping rubber 53. A collar 55 is inserted into the receiving through hole 54. The collar 55 includes a cylindrical body 56 and a flange 57. The flange 57 extends radially outwardly from one end (lower end in FIG. 11) of the cylindrical body 56. A through hole 56a axially penetrates through the cylindrical body 56 and is formed as a threaded hole. A fastening hole 58a penetrates through a vehicle body 58.

A bolt 59 is inserted through the fastening hole 58a of the vehicle body 58 and is threaded into the threaded hole 56a of the collar 55, which is, in turn, inserted into the receiving through hole 54 of the vibration damping rubber 53. Thus, the mounting portion 52 is floatingly supported by the vehicle body 58 through the vibration damping rubber 53. At this stage, the other end 56b (upper end in FIG. 11) of the cylindrical body 56 of the collar 55 abuts against a circumferential edge of the fastening hole 58a of the vehicle body 58. In this way, excessive compression of the vibration damping rubber 53 between the vehicle body 58 and the flange 57 of the collar 55 upon tightening of the bolt 59 is restrained by the other end 56b of the collar 55. Thus, a reduction in vibration damping performance of the vibration damping rubber 53 is advantageously restrained. As shown in FIG. 12, the collar 55 can be insert molded into the vibration damping rubber 53.

In the above state where the other end 56b of the cylindrical body 56 abuts against the circumferential edge of the fastening hole 58a, when the bolt 59 is further threadably tightened, an excessive force can be applied from the other end 56b of the cylindrical body 56 due to the fact that an end surface area of the other end 56b of the cylindrical body 56 is relatively small. This excessive force applied from the other end 56b of the cylindrical body 56 can generate a crack, such as a crack K shown in FIG. 13A, around the circumferential edge of the fastening hole 58a. Furthermore, the relatively small surface area of the other end 56b of the cylindrical body 56 can also cause the other end 56b of the cylindrical body 56 to be inserted into the fastening hole 58a when the bolt 59 is further threadably tightened, as shown in FIG. 13B.

To address the above disadvantage, it is conceivable to enlarge the fastening hole 58a, so that the other end 56b of the cylindrical body 56 is inserted through the fastening hole 58a and directly abuts against the bolt 59. However, when the fastening hole 58a is enlarged to have a clearance between the circumferential edge of the fastening hole 58a and the other end 56b of the cylindrical body 56, a mounting position of the wiper frame relative to the vehicle body 58 can be improperly shifted.

Furthermore, it is also conceivable to provide two collars 60, 61, which are inserted into the vibration damping rubber 53, as shown in FIG. 14. The collar 61 has a relatively large flange 61a, which abuts against the circumferential edge of the fastening hole 58a of the vehicle body 58. However, the provision of the two collars 60, 61 increases the number of the components and the number of the manufacturing steps, causing an increase in the manufacturing costs.

Furthermore, when the bolt 59 is tightened or loosened relative to the threaded hole 56a of the cylindrical body 56 of the collar 55, it could happen that the collar 55 rotates together with the bolt 59 relative to the vibration damping rubber 53, so that the bolt 59 cannot be further tightened or further loosened. This is likely to happen particularly when the bolt 59 is rusted.

SUMMARY OF THE INVENTION

The present invention addresses the above disadvantages. Thus, it is an objective of the present invention to provide a floating support structure that can securely mount a mountable member to a mount member without causing a substantial increase in a manufacturing cost of the floating support structure.

To achieve the objective of the present invention, there is provided a floating support structure for floatingly supporting a mountable member relative to a mount member. The floating support structure includes a mount assembly. The mount assembly has a collar and a vibration damping member. The collar includes a hollow cylindrical body, a larger diameter flange and a stopper. The hollow cylindrical body has female threads formed along an inner circumferential surface of the cylindrical body. The female threads of the cylindrical body are threadably engageable with a screw member, which is inserted through a fastening hole of the mount member, to secure the collar to the mount member. The larger diameter flange is provided at one end of the cylindrical body located apart from the mount member. The stopper protrudes from the larger diameter flange generally in an axial direction of the cylindrical body on a cylindrical body side of the larger diameter flange and is located between opposed side walls of a mouth of a recessed opening that is recessed in a mounting portion of the mountable member in a direction perpendicular to the axial direction of the cylindrical body of the collar. The vibration damping member includes a tubular body, a first flange and a second flange. The tubular body extends in the axial direction of the cylindrical body of the collar and has a receiving through hole. The receiving through hole axially penetrates through the tubular body and receives the cylindrical body of the collar. The tubular body is received in the recessed opening of the mounting portion of the mountable member. The first flange is provided at one end of the tubular body located adjacent to the mount member. The second flange is provided at the other end of the tubular body located apart from the mount member. The vibration damping member is clamped between the larger diameter flange of the collar and the mount member when the screw member is threadably engaged with the female threads of the cylindrical body, so that the mountable member is floatingly supported relative to the mount member.

To achieve the objective of the present invention, there is alternately provided a floating support structure for floatingly supporting a mountable member relative to a mount member. The floating support structure includes a mount assembly. The mount assembly has a collar and a vibration damping member. The collar includes a hollow cylindrical body, a larger diameter flange and a smaller diameter flange. The hollow cylindrical body has female threads formed along an inner circumferential surface of the cylindrical body. The female threads of the cylindrical body are threadably engageable with a screw member, which is inserted through a fastening hole of the mount member, to secure the collar to the mount member. The larger diameter flange is provided at one end of the cylindrical body located apart from the mount member. The smaller diameter flange is provided at the other end of the cylindrical body located adjacent to the mount member. The smaller diameter flange is urged against a circumferential edge of the fastening hole of the mount member when the screw member is threadably engaged with the female threads of the cylindrical body. The vibration damping member includes a tubular body, a first flange and a second flange. The tubular body extends in the axial direction of the cylindrical body of the collar and has a receiving through hole. The receiving through hole axially penetrates through the tubular body and receives the cylindrical body of the collar in such a manner that the other end of the cylindrical body of the collar is inserted through the receiving through hole of the tubular body of the vibration damping member. The tubular body is received in a recessed opening that is recessed in a mounting portion of the mountable member in a direction perpendicular to the axial direction of the cylindrical body of the collar. The first flange is provided at one end of the tubular body located adjacent to the mount member. The second flange is provided at the other end of the tubular body located apart from the mount member. The vibration damping member is clamped between the larger diameter flange of the collar and the mount member when the screw member is threadably engaged with the female threads of the cylindrical body, so that the mountable member is floatingly supported relative to the mount member.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PREFERRED EMBODIMENTS

Figure 1:
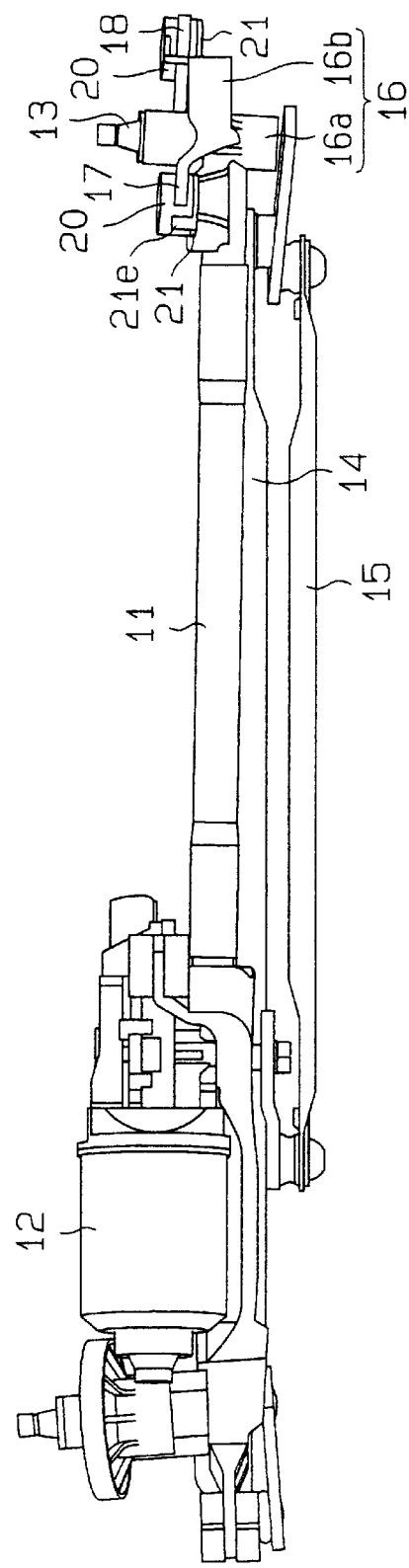
FIG. 1 is a front view of a wiper apparatus according to an embodiment of the present invention.
Figure 2:
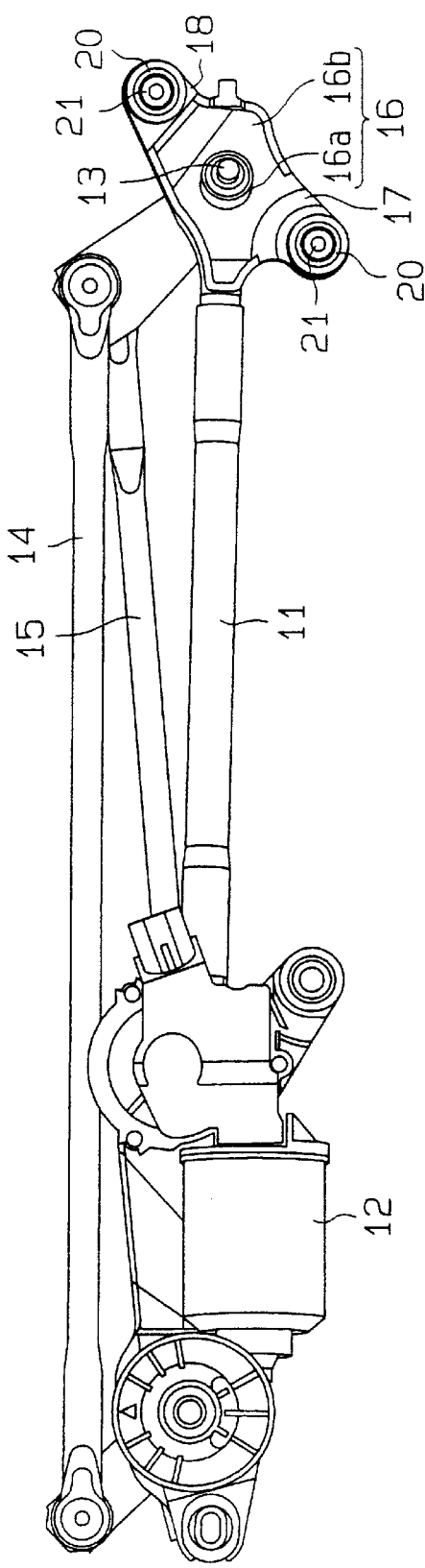
FIG. 2 is a plan view of the wiper apparatus.

An embodiment of the present invention, which is embodied in a wiper apparatus for a vehicle, will be described with reference to FIGS. 1 to 9.

A wiper motor 12 and wiper link mechanisms 14, 15 are connected to a wiper frame 11 of the wiper apparatus. The wiper link mechanisms 14, 15 convert rotation of the wiper motor 12 to rotational reciprocating movement of a pivot shaft 13. The pivot shaft 13 is rotatably supported by a pivot holder 16. The pivot holder 16 acts as a mountable member integrally connected to the wiper frame 11. A wiper arm (not shown) is secured to the pivot shaft 13, and a wiper blade (not shown) is connected to a distal end of the wiper arm.

Figure 3:
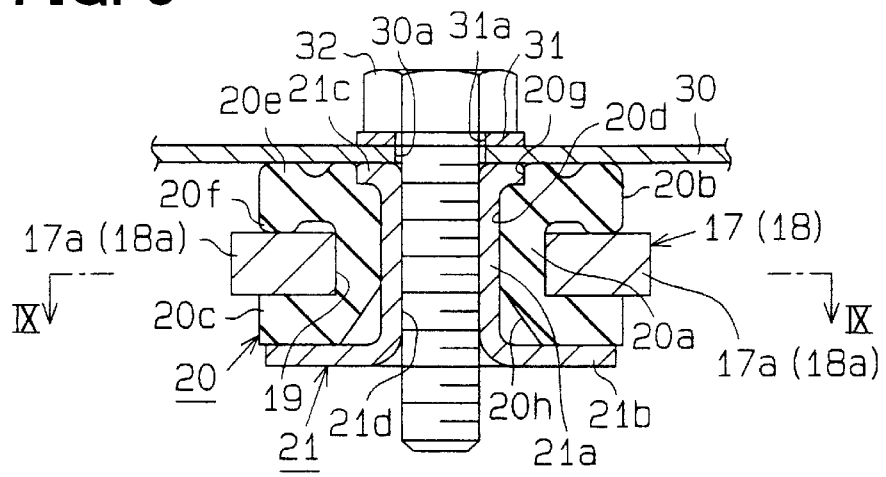
FIG. 3 is a partial cross-sectional view of a floating support structure provided in the wiper apparatus.
Figure 9:
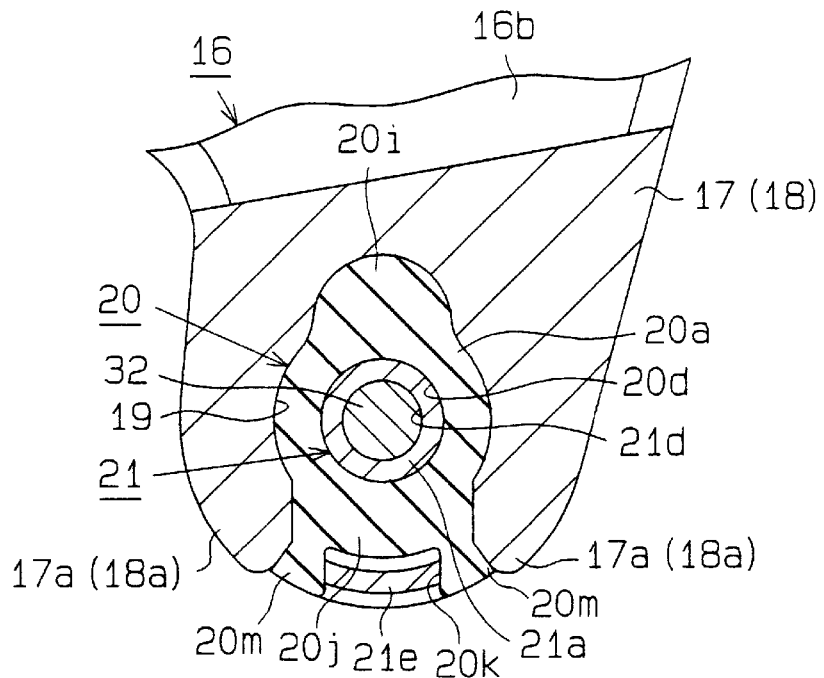
FIG. 9 is a cross-sectional view taken along line IX—IX in FIG. 3.

The pivot holder 16 includes a bearing portion 16a and a holder portion 16b. The bearing portion 16a rotatably supports the pivot shaft 13. The holder portion 16b extends radially outwardly from an axially intermediate point of the bearing portion 16a. Two mounting portions 17, 18 are provided in the holder portion 16b. As shown in FIGS. 3 and 9, a mounting hole (recessed opening) 19 extends through each mounting portion 17, 18 in an axial direction of the bearing portion 16a. The mounting hole 19 is recessed from a portion (distal end) of the mounting portion 17, 18 in a direction perpendicular to the axial direction of the bearing portion 16a, so that circumferentially opposed opening ends 17a, 18a are provided in each mounting portion 17, 18 at a mouth of the mounting hole (recessed opening) 19, as shown in FIG. 9. A vibration dampening rubber 20, acting as vibration dampening member, is received in each mounting hole 19.

Figure 4:
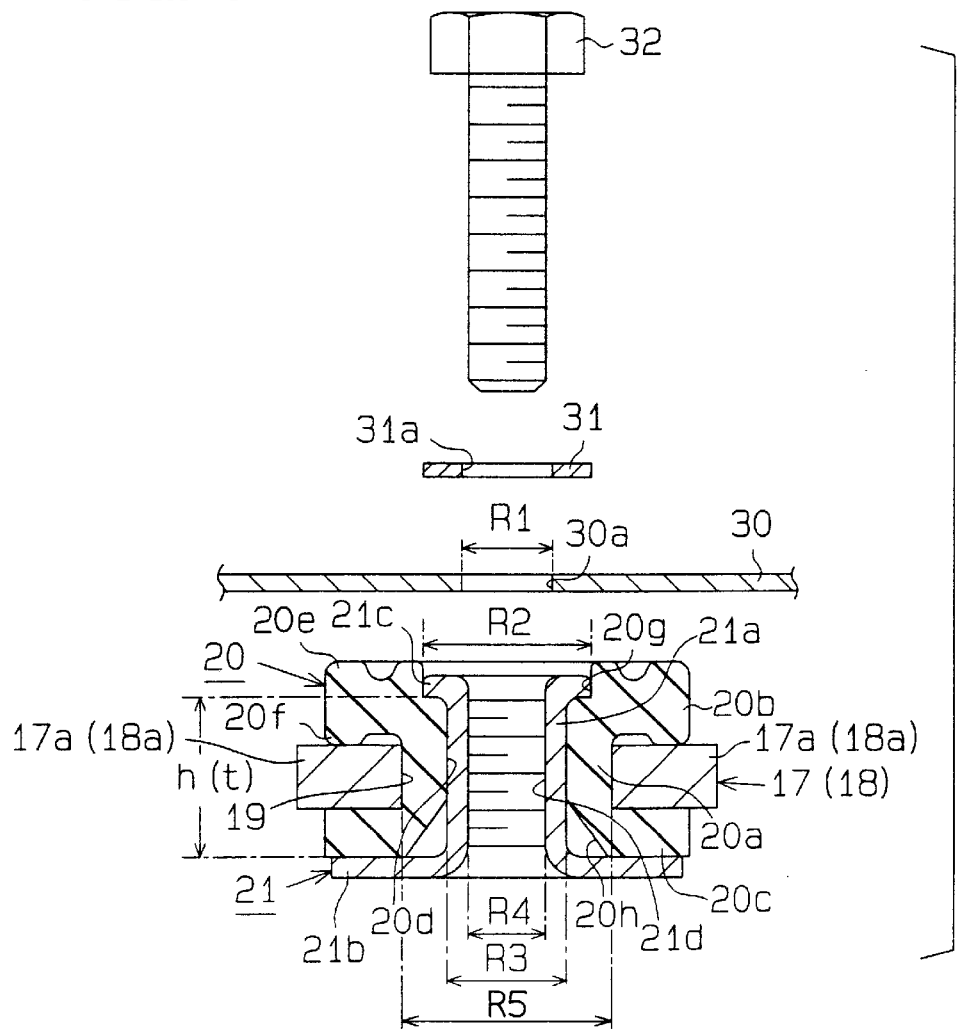
FIG. 4 is a partial exploded cross sectional view of the floating support structure.
Figure 5:
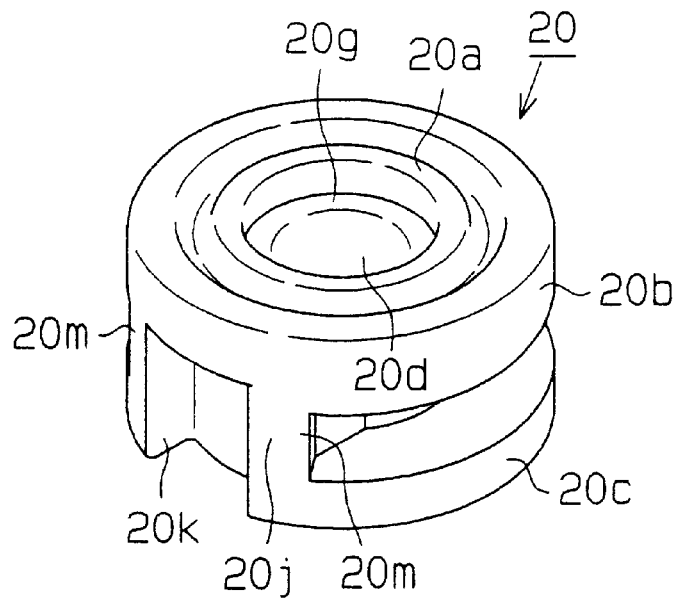
FIG. 5 is a perspective view of a vibration damping rubber according to the present embodiment.
Figure 6:
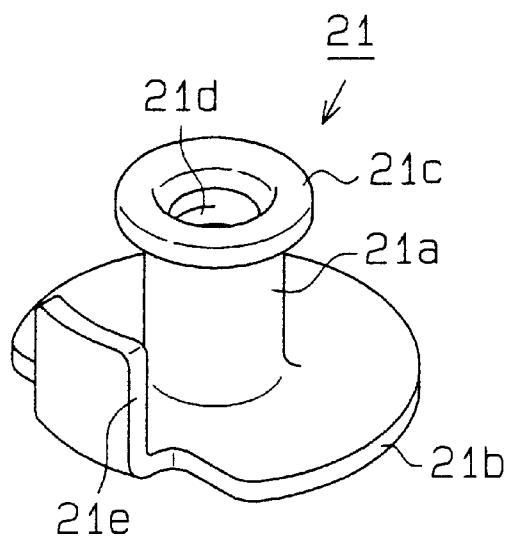
FIG. 6 is a perspective view of a collar according to the present embodiment.

With reference to FIGS. 3 to 5, each vibration damping rubber 20 includes a tubular body 20a and upper and lower flanges (acting as first and second flanges) 20b, 20c. The upper and lower flanges 20b, 20c are provided at axial ends, respectively, of the tubular body 20a. Each of the upper and lower flanges 20b, 20c has a generally annular shape. A receiving through hole (cylindrical hole) 20d axially extends through the tubular body 20a. A collar 21, which will be described later, is inserted through the receiving through hole 20d. A couple of annular protrusions 20e, 20f extend along an outer peripheral edge of the upper flange 20b. The annular protrusions 20e, 20f protrude from the outer peripheral edge of the upper flange 20b in opposite directions parallel to an axial direction of the vibration damping rubber 20. In FIGS. 3 and 4, the annular protrusion 20e protrudes upwardly, and the annular protrusion 20f protrudes downwardly. A circular recess 20g is axially recessed in the upper end of the tubular body 20a where the upper flange 20b is located. The circular recess 20g has a diameter larger than that of the receiving through hole 20d. A tapered recess 20h is axially recessed at the center of the lower end surface of the lower flange 20c and is communicated with the receiving through hole 20d. The tapered recess 20h has a decreasing inner diameter, which decreases progressively toward the upper flange 20b.

A generally semi-cylindrical bulge 20i (FIG. 9) protrudes radially outwardly from an outer peripheral surface of the tubular body 20a and axially extends between the upper flange 20b and the lower flange 20c. Furthermore, a connecting portion 20j protrudes radially outwardly from the outer peripheral surface of the tubular body 20a in diametrically opposed relationship to the bulge 20i and axially extends between the upper flange 20b and the lower flange 20c. An outer peripheral surface of the connecting portion 20j is continuous with the outer peripheral surfaces of the upper and lower flanges 20b, 20c. That is, the outer peripheral surface of the connecting portion 20j and the outer peripheral surfaces of the upper and lower flanges 20b, 20c are all located in a common cylindrical surface. A notch or recess 20k is formed in the circumferential center of the connecting portion 20j to extend from an axially outer end surface of the lower flange 20c to the upper flange 20b in the axial direction of the vibration damping rubber 20, as shown in FIG. 5. Thus, a couple of engaging portions 20m, which are circumferentially spaced by the notch 20k, are formed in the connecting portion 20j.

The collar 21 is formed through press working of a metal material. The collar 21 includes a cylindrical body 21a, a larger diameter flange 21b and a smaller diameter portion 21c. The larger diameter flange 21b extends radially outwardly from one end (lower end in FIGS. 3, 4 and 6) of the cylindrical body 21a. The smaller diameter flange 21c extends radially outwardly from the other end (upper end in FIGS. 3, 4 and 6) of the cylindrical body 21a. Female threads 21d are formed along an inner circumferential surface of the cylindrical body 21a. The larger diameter flange 21b has an outer diameter slightly smaller than that of the lower flange 20c. Furthermore, the larger diameter flange 21b includes a stopper 21e, which is bent to axially extend toward the smaller diameter flange 21c.

Figure 7:
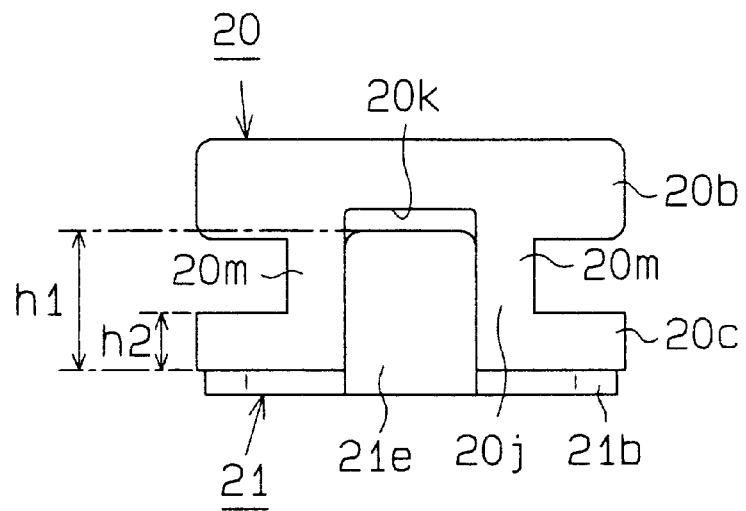
FIG. 7 is a schematic front view of the vibration damping rubber, to which a collar is inserted.
Figure 8:
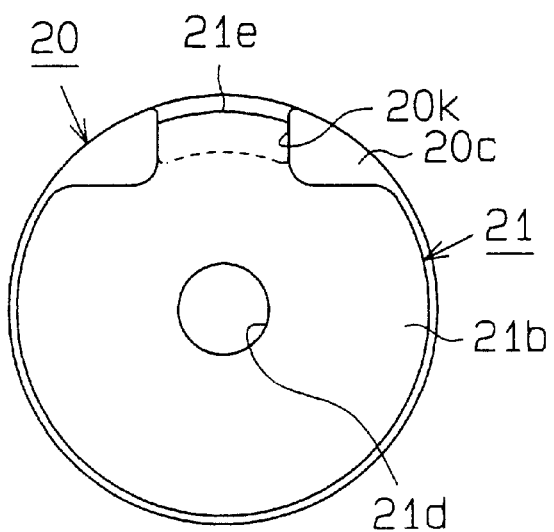
FIG. 8 is a schematic bottom view of the vibration damping rubber, to which the collar is inserted.

The cylindrical body 21a, which is located between the larger diameter flange 21b and the smaller diameter flange 21c, has an outer diameter that is substantially the same as an inner diameter of the receiving through hole 20d of the vibration dampening rubber 20. A height "h" (FIG. 4) of the cylindrical body 21a is substantially the same as a distance (height) "t" between a bottom surface of the circular recess 20g and the axially outer end surface of the lower flange 20c. Furthermore, as shown in FIG. 7, a distance (height) "h1" between an axially inner end surface of the larger diameter flange 21b and a distal end surface of the stopper 21e is larger than a distance "h2" between the axially inner end surface of the larger diameter flange 21b and an axially inner end surface of the lower flange 20c (lower end surface of the mounting portion 17, 18).

The cylindrical body 21a is inserted into the receiving through hole 20d through the tapered recess 20h of the lower flange 20c, such that the stopper 21e is received in the notch 20k, and the axially inner end surface of the larger diameter flange 21b abuts against the axially outer end surface of the lower flange 20c. As a result, the collar 21 is inserted into the vibration damping rubber 20, such that the smaller diameter flange 21c is engaged and received in the circular recess 20g.

FIG. 3 shows a floating support structure, which mount the holder portion 16b of the pivot holder 16 to a vehicle body (mount member) 30 through the corresponding vibration dampening rubber 20 mounted to the corresponding mounting portion 17, 18 of the holder portion 16b. FIG. 4 is an exploded view of FIG. 3. As shown in FIG. 3, the axially outer end surface of the upper flange 20b of the vibration dampening rubber 20, which is mounted to the corresponding mounting portion 17, 18, is engaged with the vehicle body 30. A bolt (screw member) 32 extends through a fastening hole 30a of the vehicle body 30 and a through hole 31a of a washer 31 and is threadably engaged with the female threads 21d of the collar 21. The upper flange 20b of the vibration dampening rubber 20 is compressively deformed by an axial force, which is generated upon tightening of the bolt 32, so that the smaller diameter flange 21c of the collar 21 abuts and is urged against a circumferential edge of the fastening hole 30a of the vehicle body 30.

Furthermore, as shown in FIG. 9, the vibration damping rubber 20 is fitted into the mounting hole (recessed opening) 19 of the pivot holder 16, so that the connecting portion 20j of the vibration damping rubber 20 is received in the mounting hole (recessed opening) 19 of the mounting portion 17 (or 18) of the pivot holder 16. The stopper 21e of the collar 21 is circumferentially arranged between the opposed opening ends 17a (18a) of the recessed opening 19 (or between opposed side walls of the mouth of the recessed opening 19) of the mounting portion 17 (or 18). That is, each engaging portion 20m is arranged between the stopper 21e and the corresponding opening end 17a (or 18a). The stopper 21e of the collar 21 is engaged with the opening end 17a (or 18a) via the corresponding engaging portion 20m when a rotational force is applied to the collar 21 through the tightening (or loosening) of the bolt 32. Thus, the collar 21 is not rotated together with the bolt 32 relative to the vibration damping rubber 20 (or pivot holder 16).

Figure 11:
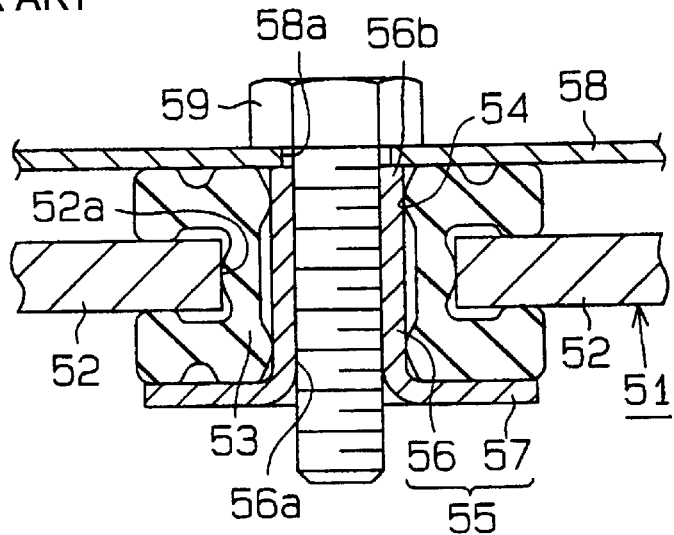
FIG. 11 is a cross-sectional view of a previously proposed floating support structure.
Figure 12:
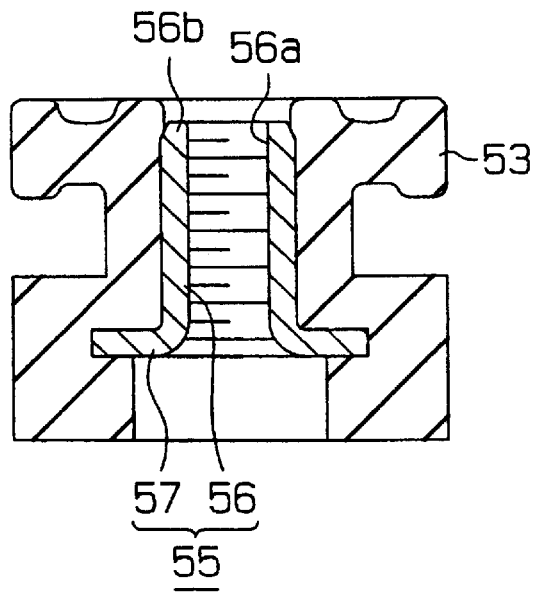
FIG. 12 is a cross-sectional view of another previously proposed floating support structure.
Figure 13A:
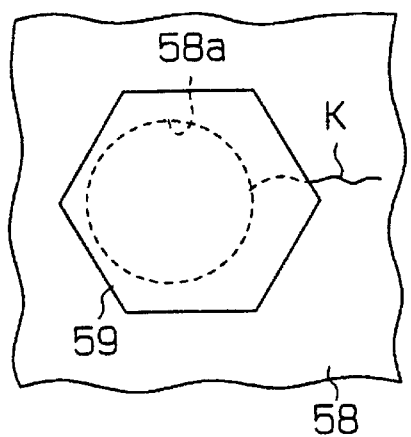
FIG. 13A is an enlarged partial plan view of the previously proposed floating support structure.
Figure 13B:
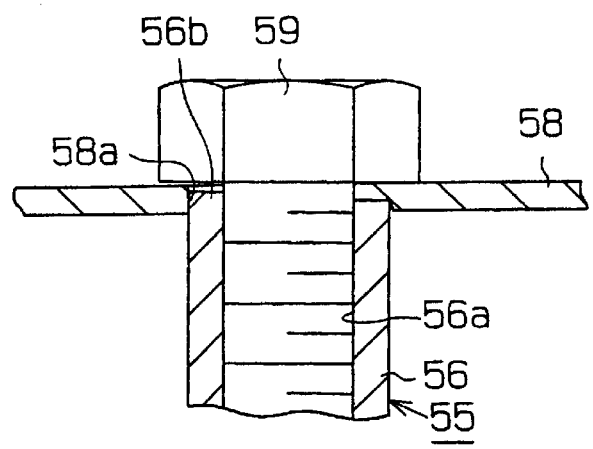
FIG. 13B is an enlarged partial cross-sectional view of the previously proposed floating support structure.
Figure 14:
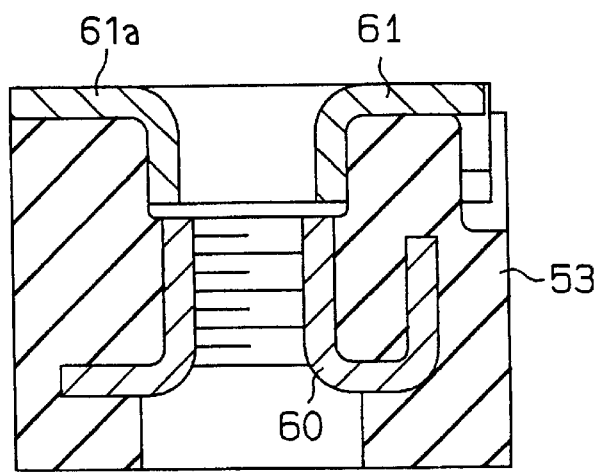
FIG. 14 is a cross-sectional view of another previously proposed vibration damping structure.

In this embodiment, as shown in FIG. 4, an inner diameter R4 of the cylindrical body 21a of the collar 21 is equal to or smaller than an inner diameter R1 of the fastening hole 30a of the vehicle body 30. An outer diameter R3 of the cylindrical body 21a of the collar 21 is smaller than an outer diameter R2 of the smaller diameter flange 21c. Furthermore, the inner diameter R1 of the fastening hole 30a is smaller than the outer diameter R2 of the smaller diameter flange 21c. That is, there are the following relationships: R4≦R1<R2 and R3<R2. Thus, the smaller diameter flange 21c extends radially outwardly from the other end of the cylindrical body 21a, such that a radial size of the smaller diameter flange 21c between an inner circumferential edge of the smaller diameter flange 21c and an outer circumferential edge of the smaller diameter flange 21 is greater than a wall thickness of the collar 21. As a result, an engaging surface area of the collar 21, which is engaged with the circumferential edge of the fastening hole 30a of the vehicle body 30, is increased in comparison to the engaging surface area of the previously proposed collar 55 shown in FIG. 11. Furthermore, since the outer diameter R2 of the smaller diameter flange 21c is larger than the outer diameter of the cylindrical body 21a of the collar 21 (i.e., the inner diameter of the receiving through hole 20d) inserted into the vibration dampening rubber 20, the collar 21 is restrained from being withdrawn from the vibration dampening rubber 20. However, the outer diameter R2 of the smaller diameter flange 21c should be chosen to allow insertion of the smaller diameter flange 21c into the vibration dampening rubber 20. Furthermore, the outer diameter R2 of the smaller diameter flange 21c should be smaller than an inner diameter R5 of the mounting hole 19 of the mounting portion 17, 18.

Characteristic advantages of the above embodiment will be described.

(1) In the collar 21, the larger diameter flange 21b and the cylindrical body 21a are integrally formed, and the female threads 21d are formed along the inner circumferential surface of the cylindrical body 21a. Thus, a nut and a washer to be engaged with the bolt 32 are not required, allowing a reduction in the number of the components and the manufacturing costs. The stopper 21e is provided in the larger diameter flange 21b of the collar 21, and the vibration damping rubber 20 is mounted to the pivot holder 16, such that the stopper 21e is located between the opening ends 17a of the mounting portion 17 (or 18), as shown in FIG. 9. Thus, when the collar 21 is fastened by the bolt 32, the stopper 21e is directly or indirectly engaged with the mounting portion 17 (or 18) to restrain the rotation of the collar 21 along with the vibration damping rubber 20 when the bolt 32 is tightened or loosened. As a result, the pivot holder 16 can be securely mounted to (or removed from) the vehicle body 30.

(2) The collar 21 has the smaller diameter flange 21c on the other end of the cylindrical body 21a. The smaller diameter flange 21c reduces the pressure to be applied to the vehicle body 30 from the collar 21. Furthermore, the smaller diameter flange 21c can restrain deformation of the vehicle body 30 caused by excessive tightening of the bolt 32. Also, the smaller diameter flange 21c can restrain the collar 21 from being inserted into the fastening hole 30a of the vehicle body 30. As a result, a size of the fastening hole 30a can be reduced, and thus the undesirable shift of the mounting position of the pivot holder 16 relative to the vehicle body 30 can be restrained. Furthermore, the smaller diameter flange 21c is engaged with the circular recess 20g in the receiving through hole 20d, so that the collar 21 is restrained from being withdrawn from the vibration damping rubber 20 when the vibration damping rubber 20 is mounted to the pivot holder 16 and also when the pivot holder 16 is mounted to the vehicle body 30. As a result, the mounting operation can be smoothly carried out.

(3) The inner diameter R4 of the cylindrical body 21a is equal to or smaller than the inner diameter R1 of the fastening hole 30a of the vehicle body 30, and the outer diameter R3 of the cylindrical body 21a is smaller than the outer diameter R2 of the smaller diameter flange 21c. Furthermore, the inner diameter R1 of the fastening hole 30a is smaller than the outer diameter R2 of the smaller diameter flange 21c. Thus, the contact surface area of the smaller diameter flange 21c relative to the circumferential edge of the fastening hole 30a is larger than the engaging surface area, which is determined by the wall thickness, of the other end 56b of the cylindrical body 56 of the previously proposed floating support structure shown in FIG. 11. As a result, it is not required to increase the wall thickness of the collar 21 to increase the engaging surface area of the collar 21 relative to the circumferential edge of the fastening hole 30a. Therefore, the reduced wall thickness of the collar 21 allows a reduction in the manufacturing costs.

(4) The outer peripheral surface of the stopper 21e is generally located in an imaginary arcuate surface that extends along the outer peripheral surface of the larger diameter flange 21b, which is coaxial with the cylindrical body 21a. Thus, the stopper 21e is located relatively apart from the central axis of the cylindrical body 21a (central axis of the fastening), so that the pressure applied from the stopper 21e to the opening end 17a (or 18a) of the mounting portion 17 (or 18) is advantageously reduced.

(5) Each engaging portion 20m is arranged between the stopper 21e and the corresponding opening end 17a (or 18a) of the mounting portion 17 (or 18), so that the stopper 21e does not directly engage the opening ends 17a (or 18a) of the mounting portion 17 (or 18). Thus, generation of frictional metallic noise can be advantageously restrained between the stopper 21e and the opening end 17a (or 18a) of the mounting portion 17 (or 18).

(6) The distance hi between the larger diameter flange 21b and the distal end surface of the stopper 21e is longer than the distance h2 between the larger diameter flange 21b and the lower end surface of the mounting portion 17 (or 18). That is, there is the following relationship: h1>h2. Advantage of this arrangement will be illustrated in comparison to the case of h1<h2. When the bolt 32 is tightened (or loosened), the collar 21 (stopper 21e) is rotated for a short distance together with the bolt 32 and is engaged with the vibration damping rubber 20. The height of the stopper 21e is less than a height of the mounting portion 17 (or 18). Thus, when the rotational force is applied to the vibration damping rubber 20 through the stopper 21e of the collar 21, a shearing stress is generated in a portion of the vibration damping rubber 20 located between the stopper 21e and the mounting portion 17 (or 18). This will cause generation of a crack in the vibration damping rubber 20. On the other hand, according to the present embodiment, the rotational force generated by the tightening (loosening) of the bolt 32 only causes compressive deformation of the engaging portion 20m located between the stopper 21e and the opening end 17a (or 18a) of the mounting portion 17 (or 18), so that generation of the shearing stress in the vibration damping rubber 20 is restrained. Thus, the generation of the crack in the vibration damping rubber 20, which could be formed upon application of the shearing stress, is restrained according to the above embodiment.

(7) In the above embodiment, the invention is embodied in the wiper apparatus. Thus, the conduction of the vibrations of the wiper motor and the vibrations generated by the wiping movement of the wiper blade to the vehicle body is restrained. Furthermore, the vibration induced undesirable shift of the mounting position of the pivot holder 16 can be restrained. The number of the components required for the attachment of the pivot holder 16 can be reduced.

The above embodiment can be modified as follows.

Figure 10:
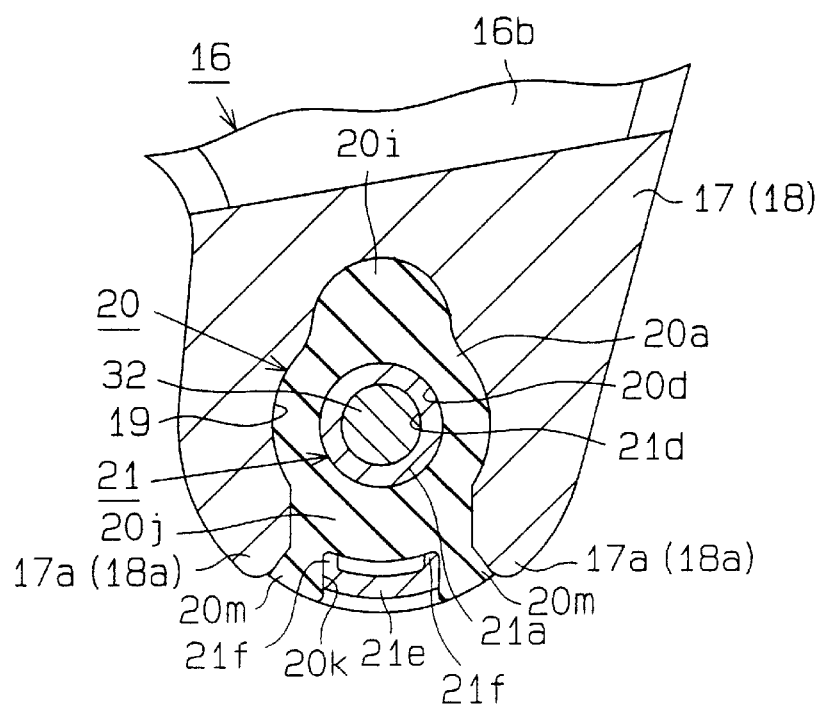
FIG. 10 is a cross-sectional view similar to FIG. 9, showing a modification of the floating support structure.

As shown in FIG. 10, a couple of contact portions 21f can be formed in the opposite circumferential ends of the stopper 21e by radially inwardly bending the opposite circumferential ends of the stopper 21e. In this way, each contact portion 21f increases an engaging surface area between the stopper 21e and the engaging portion 20m of the vibration damping rubber 20, which is located between the stopper 21e and the corresponding opening end 17a (or 18a) of the mounting portion 17 (or 18). Thus, a pressure per unit area in the engaging surface area is advantageously reduced. When the bolt 32 is tightened (or loosened), the rotational force generated by the rotation of the bolt 32 causes the compressive deformation of the corresponding engaging portion 20$m$ of the vibration damping rubber 20, which is located between the stopper 21$e$ and the mounting portion 17 (or 18). However, an engaging surface area of the engaging portion 20$m$, which is engaged with the contact portion 21$f$, is increased, so that the amount of deformation per unit area of the engaging portion 20$m$ of the vibration damping rubber 20 is reduced.

In the above embodiment, the outer diameter of the larger diameter flange 21$b$ is smaller than that of the lower flange 20$c$ of the vibration damping rubber 20. Alternatively, the outer diameter of the larger diameter flange 21$b$ can be the same as that of the lower flange 20$c$ of the vibration damping rubber 20.

The upper and lower flanges 20$b$, 20$c$ of the vibration damping rubber 20 need not be formed into the circular shape and can be formed into any other appropriate shape.

The bulge 20$i$ of the vibration dampening rubber 20 may be eliminated.

The washer 31 may be formed integrally with the bolt 32. Alternatively, the washer 31 may be eliminated.

Alternative to the rubber material, the vibration damping member 20 can be made from a resin material (e.g., elastic resin material) or any other elastic material.

The present invention can be embodied in any device other than the wiper apparatus.

Additional advantages and modifications will readily occur to those skilled in the art. The invention in its broader terms is therefore, not limited to the specific details, representative apparatus, and illustrative examples shown and described.

What is claimed is:

1. A floating support structure for floatingly supporting a mountable member relative to a mount member, the floating support structure comprising a mount assembly, wherein the mount assembly has:
    a collar including:
        a hollow cylindrical body, which has female threads formed along an inner circumferential surface of the cylindrical body, wherein the female threads of the cylindrical body are threadably engageable with a screw member, which is inserted through a fastening hole of the mount member, to secure the collar to the mount member;
        a larger diameter flange, which is provided at one end of the cylindrical body located apart from the mount member; and
        a smaller diameter flange, which is provided at the other end of the cylindrical body; and
    a vibration damping member including:
        a tubular body, which extends in an axial direction of the cylindrical body of the collar and has a receiving through hole, wherein the receiving through hole axially penetrates through the tubular body, and the tubular body is received in the recessed opening of the mounting portion of the mountable member;
        a first flange, which is provided at one end of the tubular body located adjacent to the mount member; and
        a second flange, which is provided at the other end of the tubular body located apart from the mount member, wherein the other end of the collar is inserted through the receiving through hole of the tubular body of the vibration damping member, and the vibration damping member is clamped between the larger diameter flange of the collar and the mount member when the screw member is threadably engaged with the female threads of the cylindrical body, so that the mountable member is floatingly supported relative to the mount member.

2. A floating support structure according to claim 1, wherein the smaller diameter flange is urged against a circumferential edge of the fastening hole of the mount member when the screw member is threadably engaged with the female threads of the cylindrical body.

3. A floating support structure according to claim 1, wherein:
    the mountable member is a pivot holder, which includes:
        a tubular bearing portion, which rotatably supports a pivot shaft, to which a wiper arm is secured; and
        a holder portion, which extends radially outwardly from an axially intermediate point of the bearing portion and includes the mounting portion; and
    the mount member is a vehicle body.

4. A floating support structure according to claim 1, wherein the vibration damping member is made of an elastic material.

5. A floating support structure according to claim 1, wherein the vibration damping member is made of a rubber material.

6. A floating support structure according to claim 1, wherein the one end of the tubular body includes a recess, which receives the smaller diameter flange of the collar.

7. A floating support structure according to claim 1, wherein the color further includes a stopper, which protrudes from the larger diameter flange generally in the axial direction of the cylindrical body on a cylindrical body side of the larger diameter flange and is located between opposed side walls of a mouth of a recessed opening that is recessed in a mounting portion of the mountable member in a direction perpendicular to the axial direction of the cylindrical body of the collar.

8. A floating support structure according to claim 7, wherein the stopper is located on an imaginary circle, which is centered on a central axis of the cylindrical body of the collar and has a diameter equal to an outer diameter of the larger diameter flange of the collar.

9. A floating support structure according to claim 8, wherein the stopper is an integral part of the larger diameter flange of the collar and is bent to extend in the axial direction of the cylindrical body on the cylindrical body side of the larger diameter flange.

10. A floating support structure according to claim 7, wherein the vibration damping member further includes a couple of engaging portions, wherein each engaging portion is circumferentially positioned between the stopper of the collar and a corresponding one of the opposed side walls of the recessed opening of the mounting portion of the mountable member.

11. A floating support structure according to claim 7, wherein a distance between the larger diameter flange and a distal end surface of the stopper is greater than a distance between the larger diameter flange and a lower end surface of the mounting portion of the mountable member.

12. A floating support structure according to claim 7, the stopper includes a couple of contact portions, which are formed at circumferential ends, respectively, of the stopper, wherein each contact portion is an integral part of the stopper and is bent generally in a radial direction of the stopper.

13. The floating support structure according to claim 1, wherein the receiving through hole of the vibration damping member and the smaller diameter flange are sized such that the smaller diameter flange can pass through the receiving through hole during assembly of the floating support structure.

14. The floating support structure according to claim 13, wherein the collar is a, unitary and integral part that requires no assembly.

15. The floating support structure according to claim 1, wherein the collar is a, unitary and integral part that requires no assembly.

16. A floating support structure for floatingly supporting a mountable member relative to a mount member, the floating support structure comprising a mount assembly, wherein the mount assembly has:
   a collar including:
      a hollow cylindrical body, which has female threads formed along an inner circumferential surface of the cylindrical body, wherein the female threads of the cylindrical body are threadably engageable with a screw member, which is inserted through a fastening hole of the mount member, to secure the collar to the mount member;
      a larger diameter flange, which is provided at one end of the cylindrical body located apart from the mount member; and
      a smaller diameter flange, which is provided at the other end of the cylindrical body located adjacent to the mount member, wherein the smaller diameter flange is urged against a circumferential edge of the fastening hole of the mount member when the screw member is threadably engaged with the female threads of the cylindrical body; and
   a vibration damping member including:
      a tubular body, which extends in the axial direction of the cylindrical body of the collar and has a receiving through hole, wherein the receiving through hole axially penetrates through the tubular body and receives the cylindrical body of the collar in such a manner that the other end of the cylindrical body of the collar is inserted through the receiving through hole of the tubular body of the vibration damping member, and the tubular body is received in a recessed opening that is recessed in a mounting portion of the mountable member in a direction perpendicular to the axial direction of the cylindrical body of the collar;
      a first flange, which is provided at one end of the tubular body located adjacent to the mount member; and
      a second flange, which is provided at the other end of the tubular body located apart from the mount member, wherein the vibration damping member is clamped between the larger diameter flange of the collar and the mount member when the screw member is threadably engaged with the female threads of the cylindrical body, so that the mountable member is floatingly supported relative to the mount member.

17. A floating support structure according to claim 16, wherein:
   an inner diameter of the cylindrical body of the collar is equal to or smaller than an inner diameter of the fastening hole of the mount member;
   an outer diameter of the cylindrical body of the collar is smaller than an outer diameter of the smaller diameter flange of the collar; and
   the inner diameter of the fastening hole of the mount member is smaller than the outer diameter of the smaller diameter flange of the collar.

18. A floating support structure according to claim 17, wherein the outer diameter of the smaller diameter flange of the collar is smaller than an inner diameter of the recessed opening of the mounting portion of the mountable member.

19. A floating support structure according to claim 16, wherein the second flange of the vibration damping member includes a tapered recess at a center of a lower end surface of the second flange, wherein the tapered recess is communicated with the receiving through hole of the tubular body and has a diameter that is progressively reduced toward the first flange.

* * * * *